United States Patent [19]
Yamasaki

[11] Patent Number: 5,699,517
[45] Date of Patent: *Dec. 16, 1997

[54] INFORMATION PROCESSING EQUIPMENT FOR SELECTING AS INFORMATION DATA OF A MESSAGE TO BE SENT ONE PROGRAM HAVING A SCORE GREATER THAN A THRESHOLD VALUE

[75] Inventor: Masami Yamasaki, Saitama-ken, Japan

[73] Assignee: Hitachi, Ltd., Tokyo, Japan

[*] Notice: The term of this patent shall not extend beyond the expiration date of Pat. No. 5,528,757.

[21] Appl. No.: 649,195

[22] Filed: May 17, 1996

Related U.S. Application Data

[63] Continuation of Ser. No. 127,357, Sep. 28, 1993, Pat. No. 5,528,757.

[30] Foreign Application Priority Data

Sep. 28, 1992  [JP]  Japan .................................. 4-257791

[51] Int. Cl.$^6$ ...................................... G06F 13/00
[52] U.S. Cl. ...................................... 395/200.03
[58] Field of Search ................. 395/200.02, 200.03, 395/200.09, 200.15, 600, 650, 700, 800; 370/60, 94.1, 85.13, 85.14

[56] References Cited

U.S. PATENT DOCUMENTS

| | | | |
|---|---|---|---|
| 4,815,030 | 3/1989 | Cross et al. ........................... | 395/60 |
| 5,230,048 | 7/1993 | Moy ...................................... | 395/60 |
| 5,301,233 | 4/1994 | Coutrot et al. ....................... | 380/23 |
| 5,337,360 | 8/1994 | Fischer ................................. | 380/23 |
| 5,398,331 | 3/1995 | Huang .................................. | 395/182.1 |
| 5,410,651 | 4/1995 | Sekizawa et al. ................... | 395/200.03 |
| 5,416,905 | 5/1995 | Mori et al. ........................... | 395/200.17 |
| 5,528,757 | 6/1996 | Yamasaki ............................. | 395/200.03 |

*Primary Examiner*—Moustafa M. Meky
*Attorney, Agent, or Firm*—Antonelli, Terry, Stout & Kraus, LLP

[57] ABSTRACT

A communication network system in which a plurality of information processing equipments are connected with a communication line for communication of a message. The message contains an information data to be communicated among the information processing equipments. Each of the information processing equipments has its own programs and manual information items for each of the its own programs. When one of the information processing equipment receives a message from the communication line, it discriminates whether the received message received is a specification message containing specification items of data processing expected to be performed by a program as the information data or a response message containing a served program as the information data responsive to a specification message, evaluates each of the its own programs by comparing the specification items contained in the received specification message with the manual information items stored in the one information processing equipment to provide a score of each of the its own programs and sends a message containing, as an information data, one of the its own programs having a score not lower than a threshold value.

3 Claims, 17 Drawing Sheets

| 7 | APPLICATION LAYER | ~407 |
| 6 | PRESENTATION LAYER | ~406 |
| 5 | SESSION LAYER | ~405 |
| 4 | TRANSPORT LAYER | ~404 |
| 3 | NETWORK LAYER | ~403 |
| 2 | DATA LINK LAYER | ~402 |
| 1 | PHYSICAL LAYER | ~401 |

(0.39
((1,1,1) (1,1,1) (1,1,1) (1,1,1) (1,1,1) (0,1,1,1)
(1,1,1,1) (1,1) (1,1,1) (0,1,1) (1,1)
(1,1,1) (1,1,1,1) (1,1,1) (1,1,1,1) (1,1,1,1) (1,1,1,1)
(1,1,1,1) (1,1,1) (1,1,1) (1,1,1,1) (1,1,1,1))
)

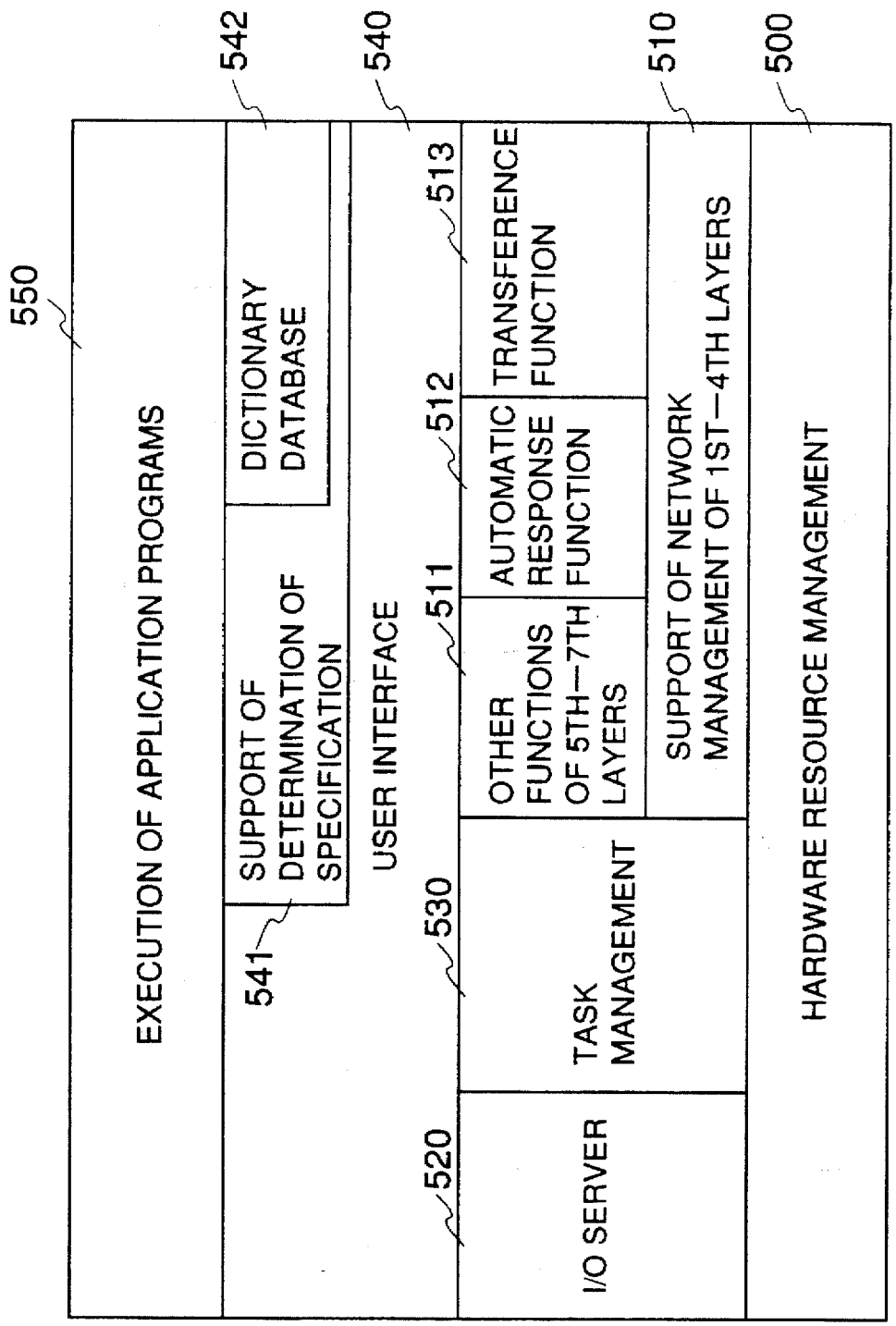

(B (chart, document, business) ~ 820

A (B & W, color, print)

A ([300, *]dpi, precision, print)

A ((Times, Helvetica, Symbol),font, Print)

A ((Times,Helvetica, Symbol)font, display)

A (ABC, type, import, file)

A ([500,*]kbyte, size, import, file)

A ("statistical analysis", chart)

A (quadratic, fitting, chart)

A ("3DSurface", type, chart)

A ("error bar", chart)

A (*,name, application)

} 801

D (XXX, name, maker, computer)

C (YYY, name, computer)

C ("YYY-OS", name, OS, computer)

C (4.1.1, version, OS, computer)

C (16Mbytes, size, memory, computer)

D (1300Mbytes, disk, I//O, computer)

D (keyboard, I/O, computer)

D (mouse, I/O, computer)

D (16inches, size, display, I/O, computer)

D ("analog RGB", type, display, I/O, computer)

} 802

INFORMATION PROCESSING EQUIPMENT FOR SELECTING AS INFORMATION DATA OF A MESSAGE TO BE SENT ONE PROGRAM HAVING A SCORE GREATER THAN A THRESHOLD VALUE

This is a continuation of application Ser. No. 08/127,357, filed Sep. 28, 1993, now U.S. Pat. No. 5,528,757.

BACKGROUND OF THE INVENTION

The present invention relates to systems which search and provide an optimal program satisfying a user requested specification from among various programs such as, for example application programs, stored in respective information processing equipments such as computers interconnected by communication lines in a network.

A conventional centralized system uses as a database server a computer connected with a particular node on a communication line in a network. A program server in the network beforehand stores data on a copy of a program in the database server or enters in the database server the node address of the computer which stores the program.

A computer connected to any node on the communication in the network accesses the database server to retrieve a desired program. When the computer finds the desired program, it loads the program from the database server when the database server has stored that program. When the server has not stored that program, the computer acquires from the database server data on the node address of a computer, which has stored that program, in the network, and loads the program, accesses the last-mentioned computer and loads that program.

It takes much time for the centralized system to enter a program. The versions of the programs are frequently improved in many cases. Each time such version is entered, the trouble required for such entry is a substantial overhead. The term "program" hereinafter implies both a program and data indispensable for execution of that program in this description as required.

Since in a large-scaled network a multiplicity of nodes make processing requests to a particular database server or a small number of database servers, communication traffic in the network is concentrated on those servers to reduce the efficiency of use of the network.

JP-A-3-116262 laid-open on May 17, 1991 (corresponding to U.S. Ser. No. 314,853, filed Feb. 24, 1989, now abandoned) discloses improvements of the efficiency of a process to be executed, responsive to a request by a client, by any particular one of a plurality of servers connected with a network.

An information processor (referred to as a broker) connected with a network manages the resources of the servers in place of the respective clients so that the client himself is not-required to monitor the respective states of the servers' resources. Before a client requests some service from a server, the client presents the contents of the desired service to the broker and has the broker introduce a server by which the client wants to be served.

JP-A-2-2450 laid-open on Jan. 8, 1990 (corresponding to U.S. Ser. No. 127,993, filed Dec. 2, 1987, now U.S. Pat. No. 5,008,853) discloses an object managing system for avoiding concurrent update which may occur when common data object stored in an information processor (server) is referred to/updated by a plurality of users via a network in a common multi-user atmosphere.

JP-A-4-60739 laid-open on Feb. 26, 1992 discloses a system where a computer acting as a client is provided with a file for managing information on application programs and information on server computers storing the information on application programs to facilitate loading of an application program to be executed onto a computer (client) from a computer (server) connected with a network and storing that program. A server computer to be accessed is selected based on such file.

JP-A-1-126736 laid open on May 18, 1989 (corresponding to U.S. Ser. No. 886,622, filed Aug. 21, 1987 now abandoned) discloses a system which processes various types of objects, using another application program which does not directly know the types of objects, in which the data to be processed with an application program is called a typed object. To this end, a process called an object manager is provided to search and start an application program which is able to process the corresponding type of object.

SUMMARY OF THE INVENTION

It is an object of the present invention to provide a communication network system in which a plurality of information processing equipments each holding its own program is connected with communication lines of a bus, star or ring type or of any other type and in which the user who has specified specification items of data processing to be performed is capable of easily retrieving a desired program the structure of which he does not know, although the user does not know which information processing equipment holds that program.

According to one aspect of the present invention, a message to be sent from an information processing equipment connected with a communication line or a message to be received by an information processing equipment from a communication line with which the information processing equipment is connected contains an information data to be communicated among the information processing equipments. The information processing equipment stores therein its own programs and manual information items for each of the its own programs and discriminates whether a received message is a specification message containing specification items of data processing expected to be performed by a program (retrieval key) as the information data or a response message containing a served program as the information data responsive to a specification message, evaluating each of the its own programs by comparing the specification items contained in a received specification message with the stored manual information items to provide a score of each of the its own programs and sending a response message containing, as the information data, one of the its own programs having a score not lower than a threshold value.

According to another aspect of the present invention, at least one routing equipment is provided to interconnect a plurality of communication lines. A plurality of information processing equipments are connected with each communication line and a message to be sent from an information processing equipment connected with a communication line or a message to be received by an information processing equipment from a communication line with which the information processing equipment is connected contains an information data to be communicated among the information processing equipments. The routing equipment serves to transfer a message between an information processing equipment connected with a communication line and an information processing equipment connected with another communication line.

The information processing equipment stores therein its own programs and manual information items for each of the its own programs and discriminates whether a received message is a specification message containing specification items of data processing expected to be performed by a program as the information data or a response message containing a served program as the information data responsive to a specification message, evaluating each of the its own programs by comparing the specification items contained in a received specification message with the stored manual information items to provide a score of each of the its own programs and sending a response message containing, as the information data, one of the its own programs having a score not lower than a threshold value.

The routing equipment stores at least served programs and manual information items for each of the served programs and specification message identifiers representative of specifications of data processing expected to be performed by a program, all contained in messages having passed through the routing equipment, discriminates whether a received message is a specification message or a response message, evaluating, for the received message being a specification message which contains a specification message identifier different from any of the stored specification message identifiers, the stored served programs by comparing the specification items contained in the received specification message with the stored manual information items to provide a score of each of the stored served programs, selecting one of the stored provided programs having a score not lower than a threshold value and sending a response message containing, as the information data, the selected provided program to a communication line. Meanwhile, for the received message being a response message, the routing equipment compares the program and its associated specification message identifier contained in the received response message with the stored served programs and their associated specification message identifiers and discards the received response message if the program and its associated specification message identifier contained in the received response message are identical with one of the programs and its associated specification message identifier stored in said second storage means and transferring the received response message between two communication lines if the program and its associated specification message identifier contained in the received response message are not identical with any one of the stored programs and its associated specification message identifier. Thus, the specification identifiers to be stored in the routing equipment may include those contained in specification messages received and transferred by the routing equipment and those contained in response messages received and transferred by the routing equipment. The specification message identifiers contained in the specification messages are stored in the routing equipment for a predetermined time as determined by reception of the respective specification messages.

It is another object of the present invention to provide a method of retrieving a requested program which the user desires to obtain in the above network system.

As described above, the routing equipment stores information data contained in messages transferred so far and makes a response to a requested specification message using the stored information data in place of the information processing equipment. Thus, the response time is reduced and diffusion of information data from a repetition point where the routing equipment is connected to a communication line to remoter equipments to thereby reduce communication traffic in the overall network system.

Further, response messages having the same response information (the same response information data) returned by many information processing equipments in the network system in response to a requested specification message are prevented from passing together through a routing equipment at a repetition point of the network system to thereby prevent an unnecessary increase in the overall communication traffic in the network system.

BRIEF DESCRIPTION OF THE DRAWINGS

FIG. 5 shows the functional blocks of an OS of the computer of FIG. 1.

FIG. 8 shows an illustrative expression of a keyword list for a requested specification.

DESCRIPTION OF THE PREFERRED EMBODIMENTS

Figure 1:
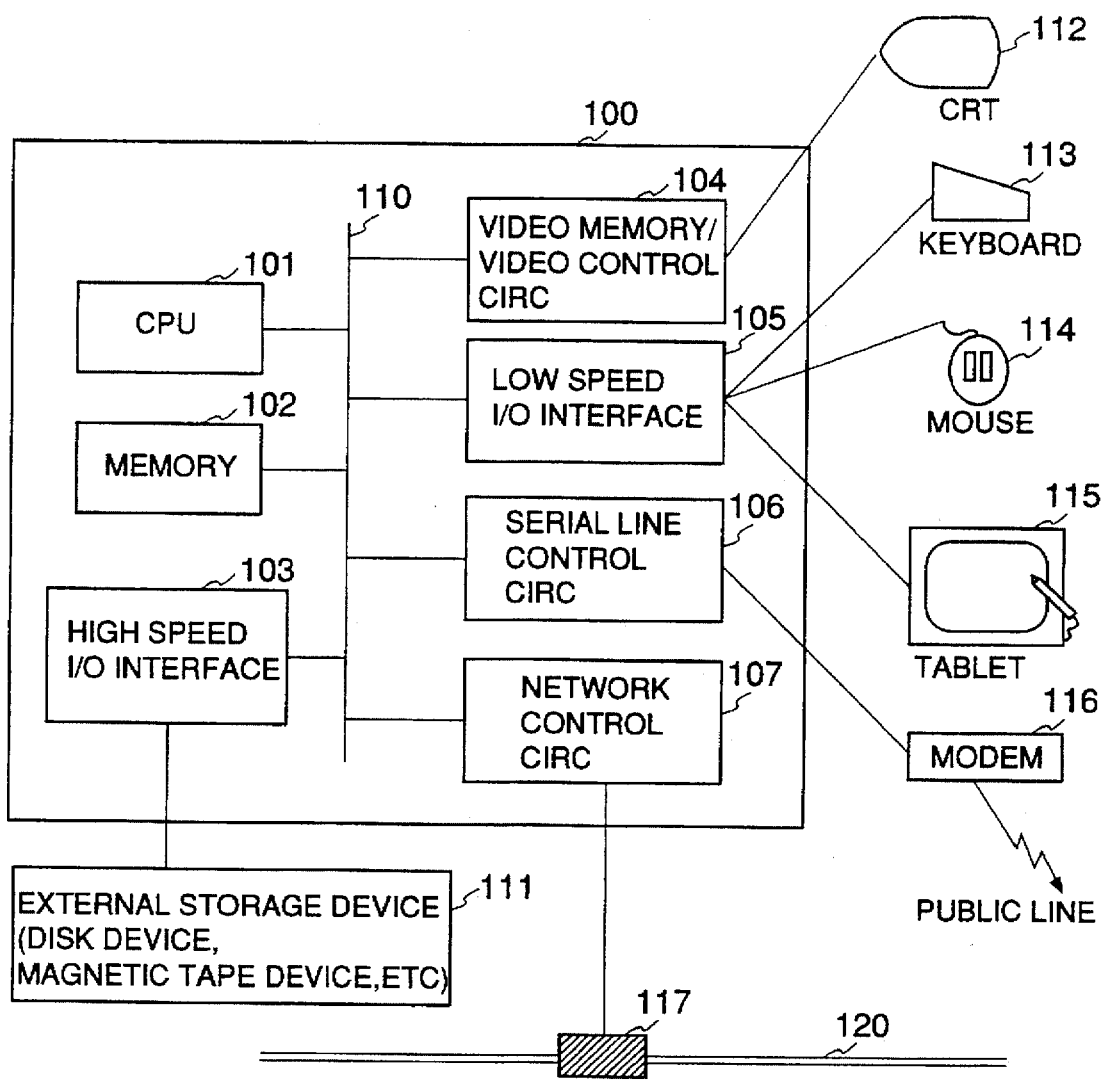
FIG. 1 shows the structure of a computer having a network communication function usable in one embodiment of the present invention.

The present invention may be realized as one function of an OS for an information processing equipment, for example a computer, having a network communication function, as shown in FIG. 1. The computer 100 of FIG. 1 is provided with a central processing unit (CPU) 101, random access memory 102, high speed I/O interface 103, video memory/ control circuit 104, low speed I/O interface 105, serial line control circuit 106, and network control circuit 107 which are interconnected by a bus 110 to exchange data therebetween. The high speed I/O interface 103 controls secondary storages 111 such as a magnetic disk and a magnetic tape. The video control circuit 104 controls a display 112. The low speed I/O interface 105 controls low speed data input units such as a keyboard 113, mouse 114 and tablet 115. The serial line control circuit 106 controls a modem 116 to make communication via a public line.

The computer 100 is connected via the network control circuit 107 with a communication line 120. In the present embodiment, the computer 100 controls a transceiver 117 connected with the communication line 120 for the local area network. A plurality of such serial line control circuits 106 and a plurality of such network control circuits 107 are provided in the computer 100 depending on the number of communication lines with which the computer 100 is connected.

Figure 2:
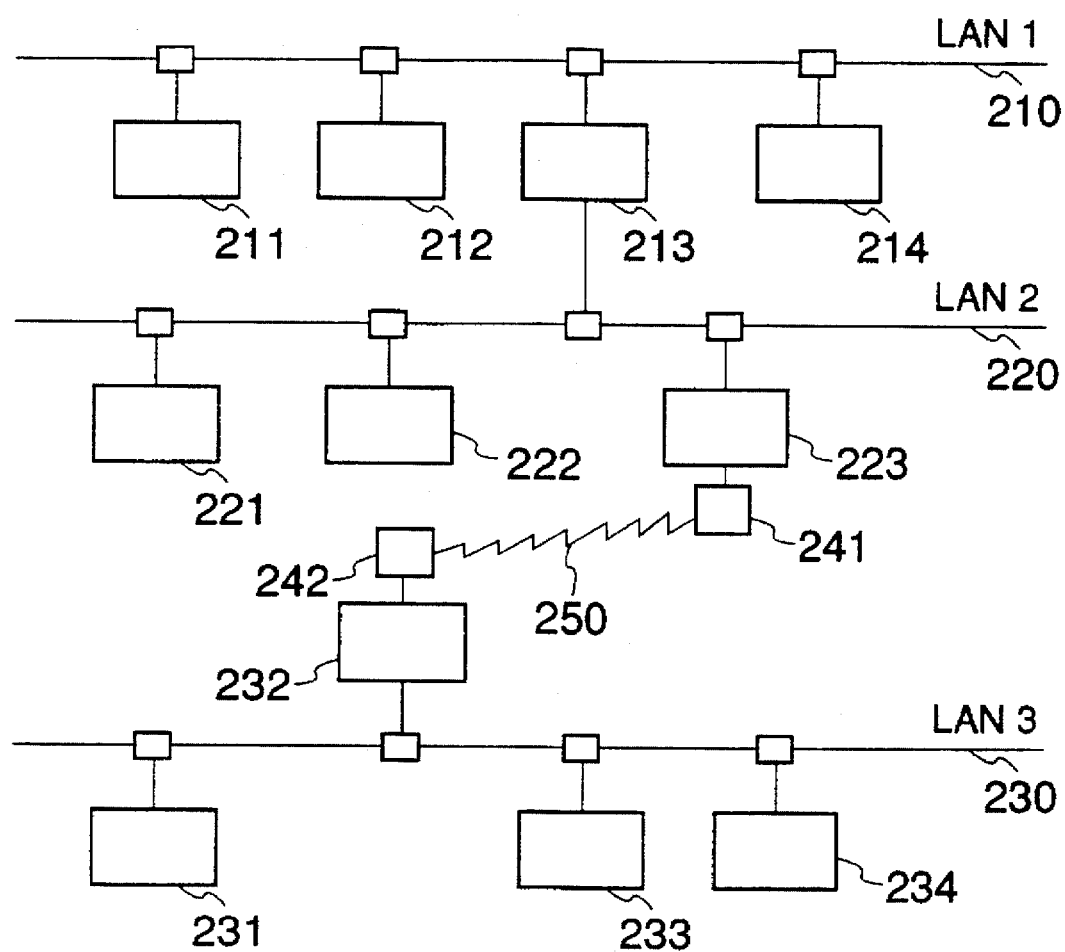
FIG. 2 shows a plurality of local area networks interconnected by routing equipments in one embodiment of the present embodiment.

FIG. 2 shows an embodiment of a single large network system composed of a plurality of communications, for example local area networks (LANs), interconnected with each LAN having a plurality of information processing equipments (for example, information processing computers) connected therewith. The computers 211–214 each having the structure shown in FIG. 1 are connected with a LAN 210.

The computers 221, 222, 223 and 213 each having the structure shown in FIG. 1 are connected with a LAN 220. The computers 231–234 each having the structure shown in FIG. 1 are connected with a LAN 230. The modems 241 and 242 are connected with the computers 223 and 232, respectively, and also connected with each other through a public line 250. The computer 213 is connected with both of the LANs 210 and 220 so that information data in the LAN 220 can be transferred to the LAN 210 or vice versa. The computer 213 having such function is hereinafter referred to as a "routing computer" or "routing equipment". The computers 223 and 232 are capable of exchanging information data through the public line 250 and hence information data in the LANs 220 and 230. In this case, the computers 223 and 232 cooperate to realize a routing computer.

Figure 3:
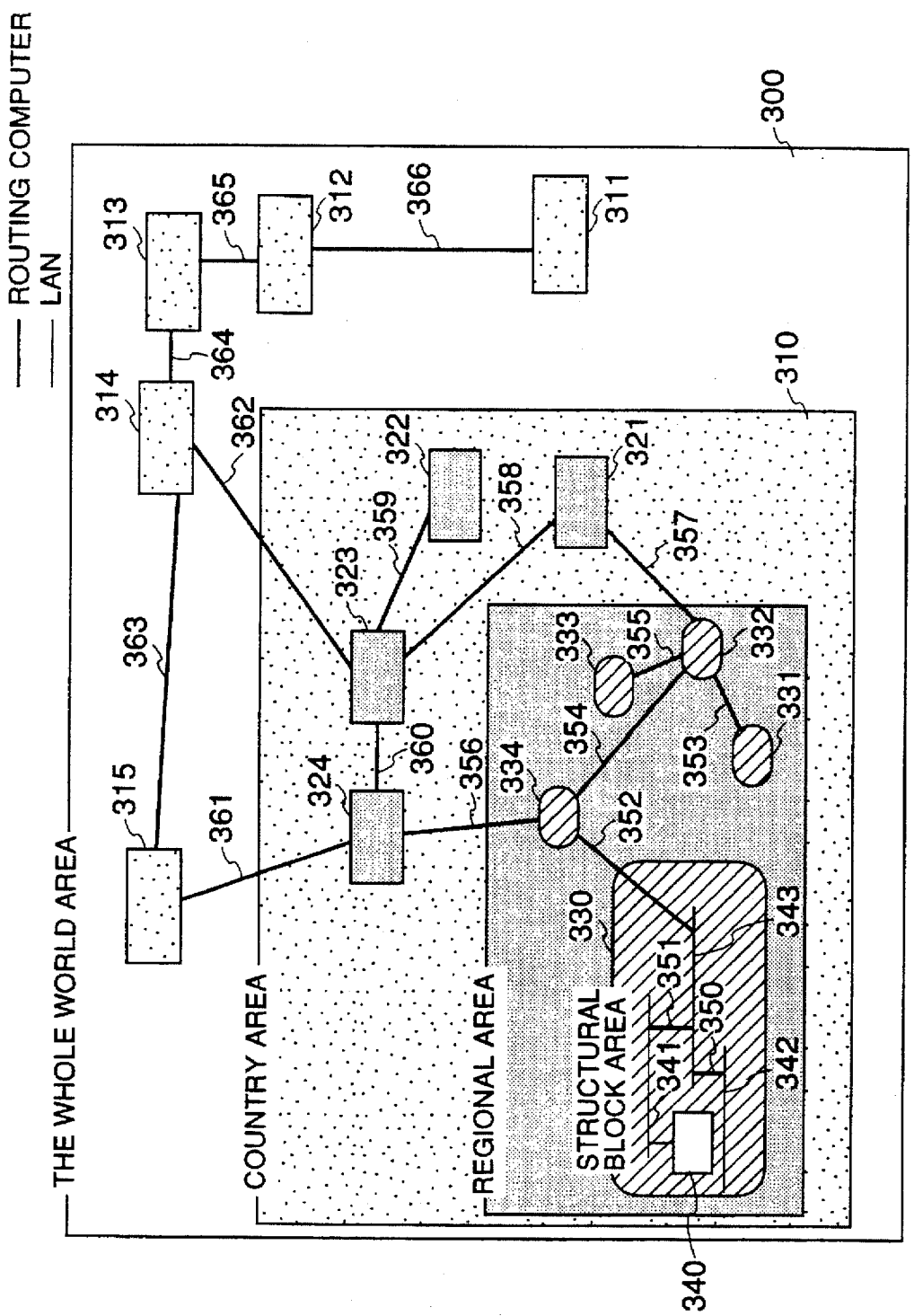
FIG. 3 shows one example of a plurality of communication lines interconnected in a wide area network system as one embodiment of the present invention.

FIG. 3 shows an embodiment directed to the world-wide expanded connection of LANs (communication lines) of FIG. 2. An area 300 is the whole world area; areas 310–315 is respective different country areas; areas 320–324 are regional or group areas such as firms; and areas 330–334 are structural block areas. The LANs 341–343 are provided in the area 330 and connected by routing computers 350, 351. The LAN 343 in the structural area 330 is connected by a routing computer 352 with a LAN in the structural areas 334. The computers connected with the LANs in areas 330 and 334 are communicable with each other through the routing computer 352. Similarly, the structural areas 334 and 332 are connected by a routing computer 354; the structural areas 331 and 332 are connected by a routing computer 353; and structural areas 333 and 332 are connected by a routing computer 355. All the computers connected with the LAN in the regional area 320 are communicable with each other through the respective routing computers.

In the country area 310, the regional areas 320 and 324 are connected by a routing computer 356; regional areas 324 and 323 are connected by a routing computer 360; regional areas 322 and 323 are connected by a routing computer 359; and regional areas 321 and 323 are connected by a routing computer 358. All the computers connected with the LANs in the country area 310 are communicable with each other through the respective routing computers.

In the whole world area 300, the country areas 310 and 315 are connected by a routing computer 361; the country areas 315 and 314 are connected by a routing computer 363; the country areas 310 and 314 are connected by a routing computer 362; the country areas 314 and 313 are connected by a routing computer 364; the country areas 313 and 312 are connected by a routing computer 365; and the country areas 312 and 311 are connected by a routing computer 366. All the computers connected with all the LANs in the whole world area 300 are communicable with each other through the respective routing computers. As just described above, the computers in the whole world which are connected with the LANs connected directly or indirectly by the routing computers are communicable with each other.

Figures 4, 13:
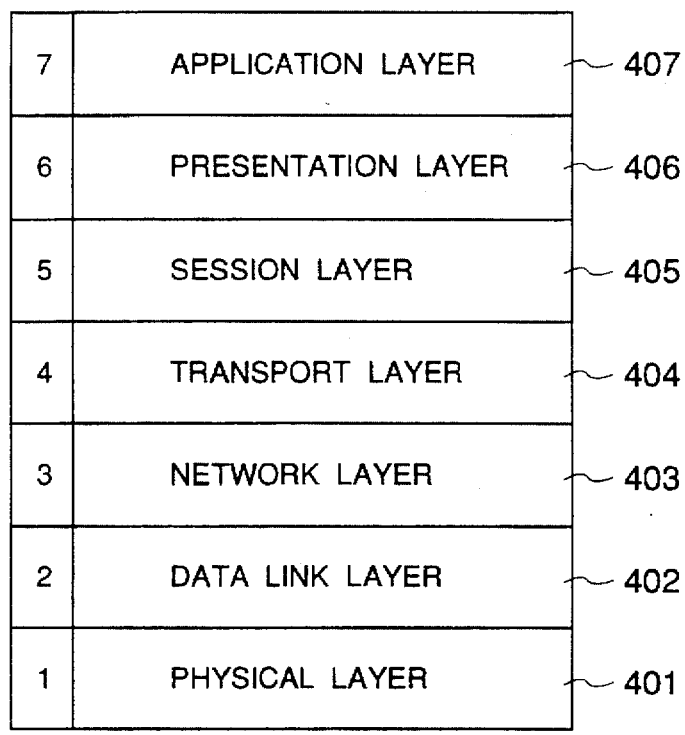
FIG. 4 shows an OSI reference model.
FIG. 13 shows an illustrative result of evaluation by a computer of its own program.

FIG. 4 shows a functional hierarchy (OSI (Open System Interconnection) reference model) of a communication protocol in a network. The embodiment is realized as a communication protocol in three upper layers, i.e., a session layer 405, presentation layer 406 and application layer 407. A physical layer 401, data link layer 402, network layer 403 and transport layer 404 use a standard communication protocol such as a TCP/IP protocol.

FIG. 5 is a schematic functional block diagram of an OS for a computer having the structure of FIG. 1. Block 500 has a function of performing control of the respective elements of FIG. 1 specific thereto in accordance with requests from blocks 510, 520 and 530. The block 510 has the functions of the first-fourth layers 401–404 of the OSI reference model of FIG. 4. Block 511 is for an already established communication protocol such as NFS using the function of the block 510. Block 512 is a functional block which responds to inquiry about data and application program resources possessed by computers connected with the network and having the OS of FIG. 5. Block 513 is a functional block which transfers inquiry about program resources to a computer connected to another network (communication line) when the computer having the OS of FIG. 5 thereon is a routing computer. The block 520 is a functional block which operates as a logically standardized unit such as an X-window server not depending on the hardware specifications of the I/O units 111–116 of FIG. 1. The block 530 is a functional block which distributes the CPU resources to many processes.

Block 540 provides a function which handles user interfaces of the upper layer blocks 541, 542 and 550 integrally. The block 541 is a functional block which provides interfaces for describing a specification of required resources to be searched among data and application program resources in many computers connected with the network. The block 542 is a dictionary database which has stored keywords the meanings of which are classified hierarchically and used in the block 541. The block 550 shows various application programs executed by a computer where the OS of FIG. 5 operates.

Figure 6:
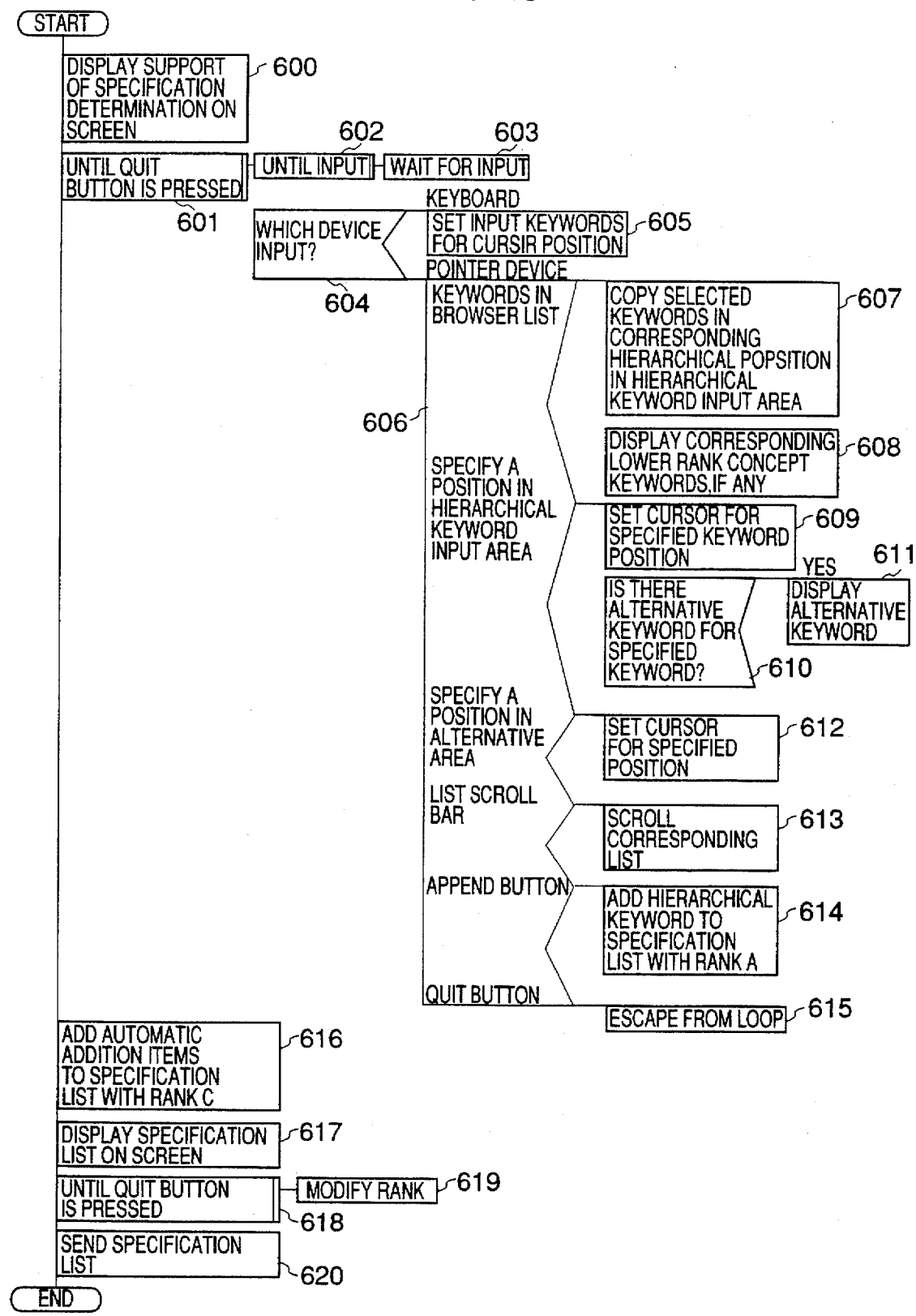
FIG. 6 shows the procedure of support of preparation of a requested specification of FIG. 5.
Figure 7:
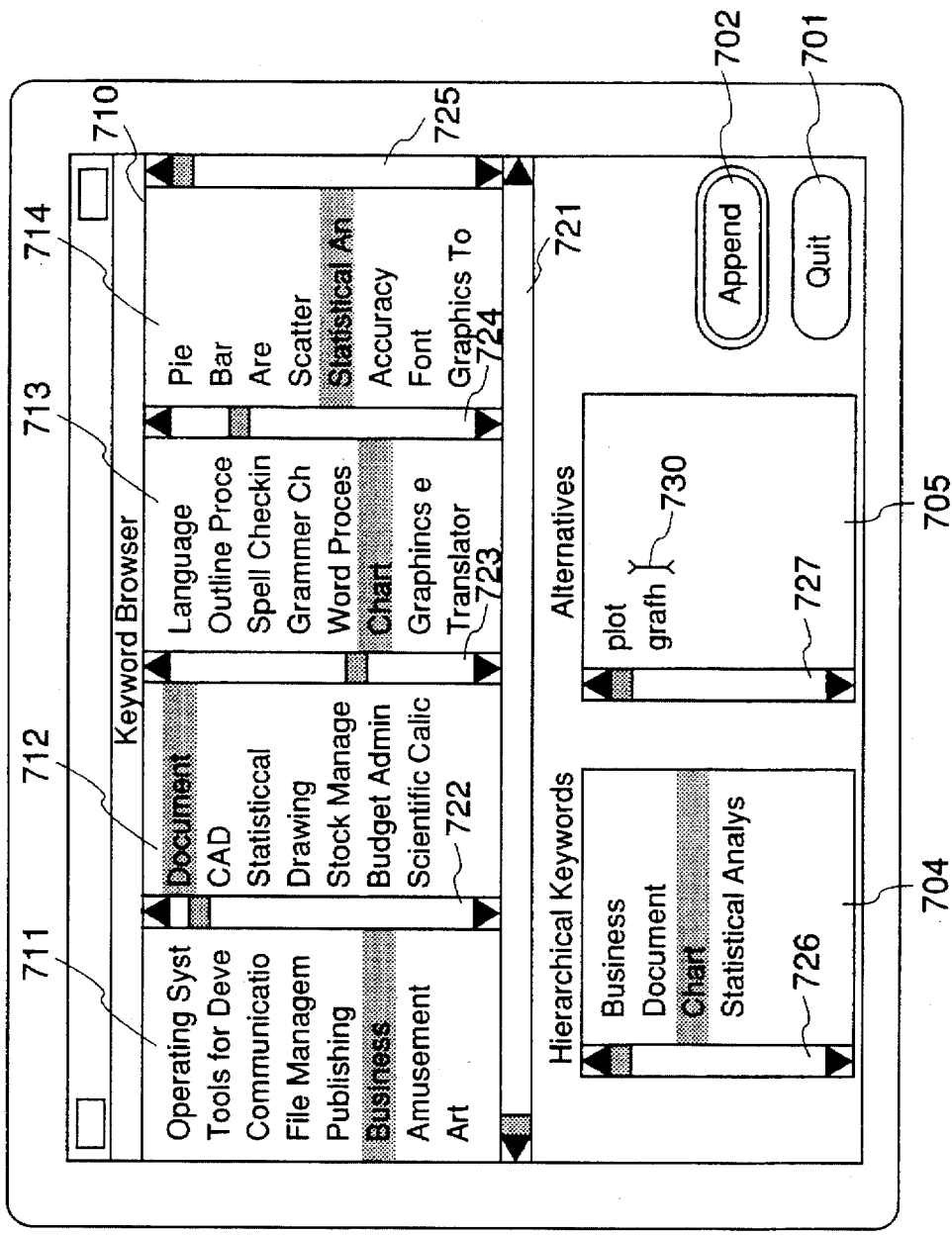
FIG. 7 shows an illustrative picture of support of preparation of a requested specification.
Figure 9:
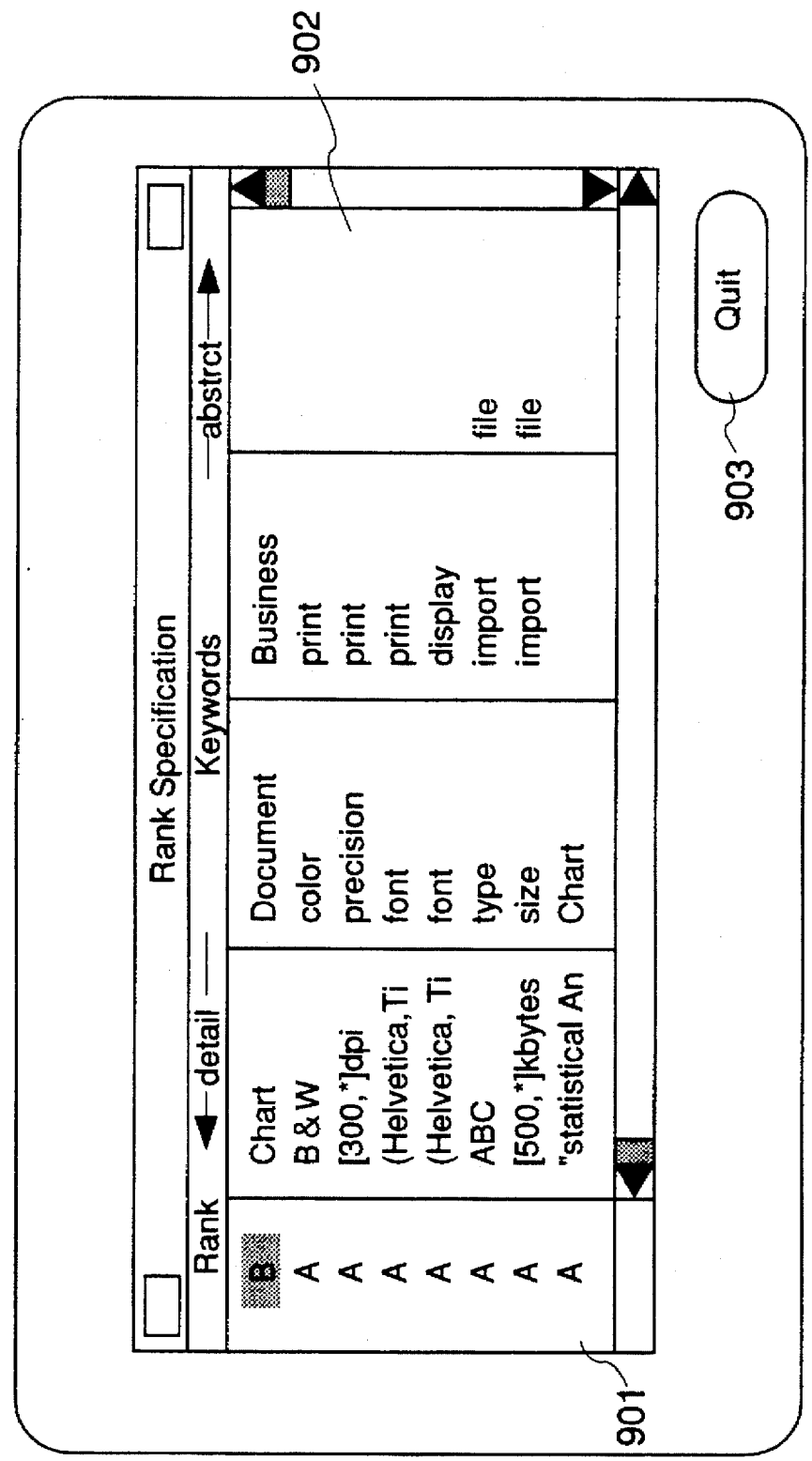
FIG. 9 shows an illustrative picture of a rank change window of the list items.

Next, an embodiment of the block 541 of FIG. 5 will be described with respect to a problem analysis diagram (PAD) of FIG. 6, illustrative pictures of FIGS. 7 and 9 and a list of a requested specification (requested specification items) of FIG. 8, for example, when the user needs conversion of numerical data to a diagram in the computer 340 of FIG. 3 connected to the wide area network of FIG. 3, and having the structure of FIG. 1 and having the OS of FIG. 5 in operation.

Assume that the user of the computer 340 has the following requested specification, for example: "A graph is desired to be prepared on the basis of data on a spread sheet program "A". Since the graph has to be camera-ready for an article contribution, the printing quality is required to be at 300 dpi or higher. Notes may be added to a graph picture.

The type of letters used should be Helvetica, Times, or Symbol. None of display and printing is required to be made in color, but they may be monochromatic. The graph is required be displayed with error bars after statistic processing. The quantity of data is small. One graph is required to be displayed in a 3-dimensional manner".

First, a requested specification preparation support program stored in the secondary storage 111 of FIG. 1 is transferred to the memory 102 and executed by the CPU 101. This program contains process steps 600–620 of FIG. 6 to be described below. A required specification preparation support picture of FIG. 7 is displayed on the CRT 112 of FIG. 1 (step 600). Until a Quit button 701 is pushed, the following is repeated (step 601): An input operation through the keyboard 113, the mouse 114 as a pointing device or the tablet 115 is awaited (steps 602, 603). If there is any input operation, it is determined which input device is used (step 604). When it is the keyboard, the keyed-in keyword is copied in the current position of the cursor (step 605). In the illustrative picture of FIG. 7, the keyword "graph" is input at the position of the cursor 730. When an input is given through the pointing device, it is determined what is selected (step 606). When a keyword displayed in a keyword display area 710 for a Keyword Browser is selected, the selected keyword is copied in the position in a hierarchical order corresponding to a keyword display area 704 for Hierarchical Keywords (step 607). When keywords specified more in concept than the selected keyword are in the dictionary database of FIG. 5, they are all displayed in a list area on the right-hand side of the list area where the selected keyword is displayed (step 608). In an illustrative picture of FIG. 7, a keyword which is indicative of a specified concept related to a selected "Document" of the requested area 712 is displayed in the list area 713. When the keyword is in one of positions in a keyword display area 704 for the Hierarchical Keywords, the cursor is set in that position (step 609). When that position is not empty, but occupied by a keyword (step 610), keywords which are usable as an alternative to that keyword are displayed (step 611). The alternative keywords have a hierarchical relationship which has not been entered in the dictionary database. This alternative keyword is input at step 605. When a position in the alternative keyword display area 705 is indicated, the cursor is set at that position (step 612). When any one of list scrawl bars 721–727 is selected, a list of display areas corresponding to that scrawl bar is scrawled (step 613). When the Append button 702 is depressed, the Hierarchical Keywords arranged in the user input item portion 801 of a required specification list of FIG. 8 are listed in a reverse order in an item list portion 820 of FIG. 8 and a rank item portion 810 is added with a rank value of A (step 614). The rank value represents a value used for determining the degree of fit between the required specification and a program which fits to the requested specification when the program is retrieved. When the Quit button 701 is depressed, the repetition of the step 601 ends and control passes to step 616 (step 615).

A specification, etc., of a computer being used are represented in the form of a list and added with a rank C in an automatic addition item portion 802 of the requested specification list of FIG. 8 (step 616). As shown in an illustrative picture of FIG. 9, the requested specification list of FIG. 8 is displayed such that the rank value is displayed in a rank display area 901 and the respective items of the requested specification are displayed in a requested specification item display area 902 (step 617). Until the Quit button 903 is depressed (step 618), the rank value of the rank display area which the user has determined that it should be modified is modified through the keyboard (step 619). When the Quit button 903 is depressed and the modification of the rank value ends, the requested specification list of FIG. 8 having the modified rank value is sent to all the computers connected directly to the local area network with which the computer which now processes the request specification is connected (step 620). In the example of FIG. 3, when the computer is a sender or originator of the requested specification, the computer 340 broadcasts the requested specification is broadcasted toward all the computers connected to the local area network 341.

Figure 10:
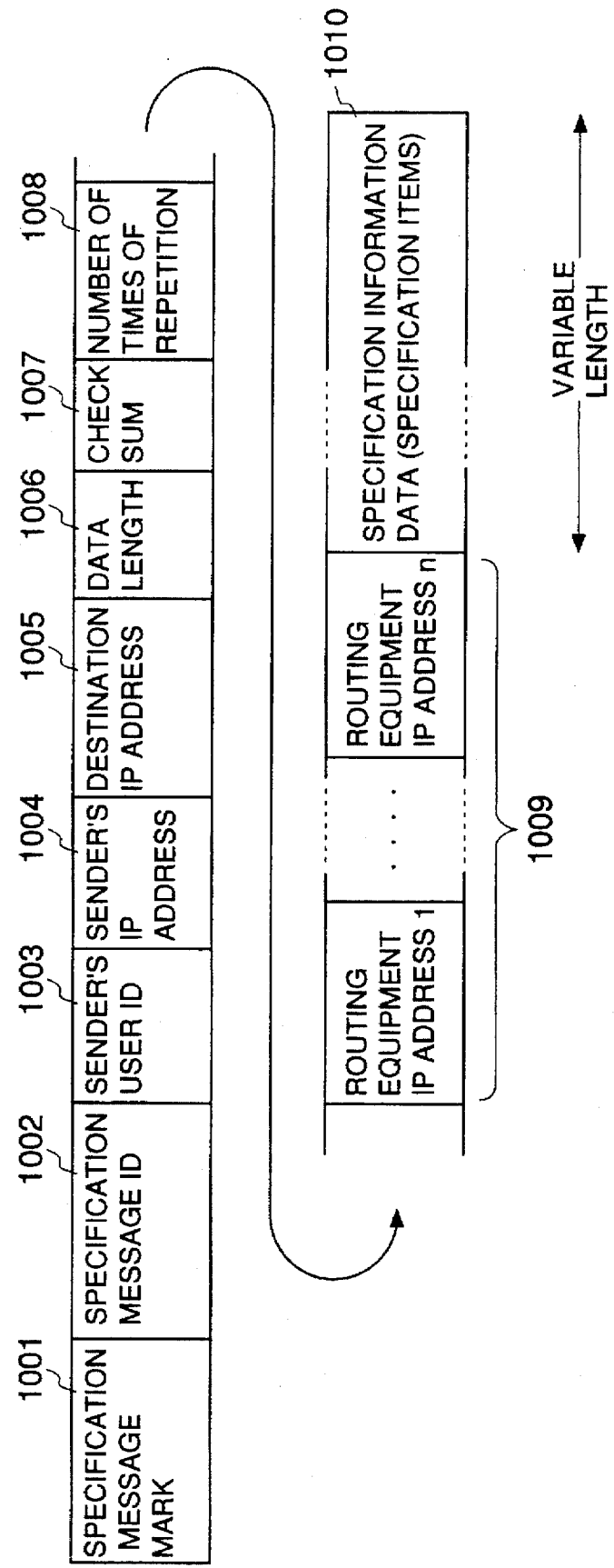
FIG. 10 shows a communication data structure of a requested specification message used in one embodiment of the present invention.

FIG. 10 shows a communication data structure of a requested specification message. This message starts with a request specification message mark 1001 indicating that the message includes requested specification information data as information data to be communicated between information processing equipments, for example, information processing computers. The mark 1001 is followed by requested specification message ID (identifier) 1002 which is a string of numerals representative of a combination of an internet protocol address of the sender or originator and a time when the requested specification message was sent and which is used to uniquely discriminate many requested specification messages occurring in the whole network. The requested specification message ID 1002 is then followed by the user ID 1003 as the request originator, an IP address 1004 of the requested specification message sender and an IP address 1005 of a destination information processing equipment (for example, information processing computer). The broadcast address is written as the IP address of the destination information processing equipment. The broadcast address is an address which each of all the information processing equipments or computers interprets as its own address. The IP address 1005 is followed by a data length 1006 extending from the requested specification message mark 1001 to a requested specification item 1010 and a check sum 1007 calculated on the basis of the overall communication message. Transfer of a message between different networks (lines) results from repetition by routing equipments. For recording this repetition, the number of times of repetition 1008 and routing equipment IP address 1009 corresponding in number to the number of times of repetition 1008 follow the check sum 1007. Requested specification items, for example, in the form of a requested specification list of FIG. 8 are stored in the requested specification information data 1010 composing the trailing end of the message.

Figure 11:
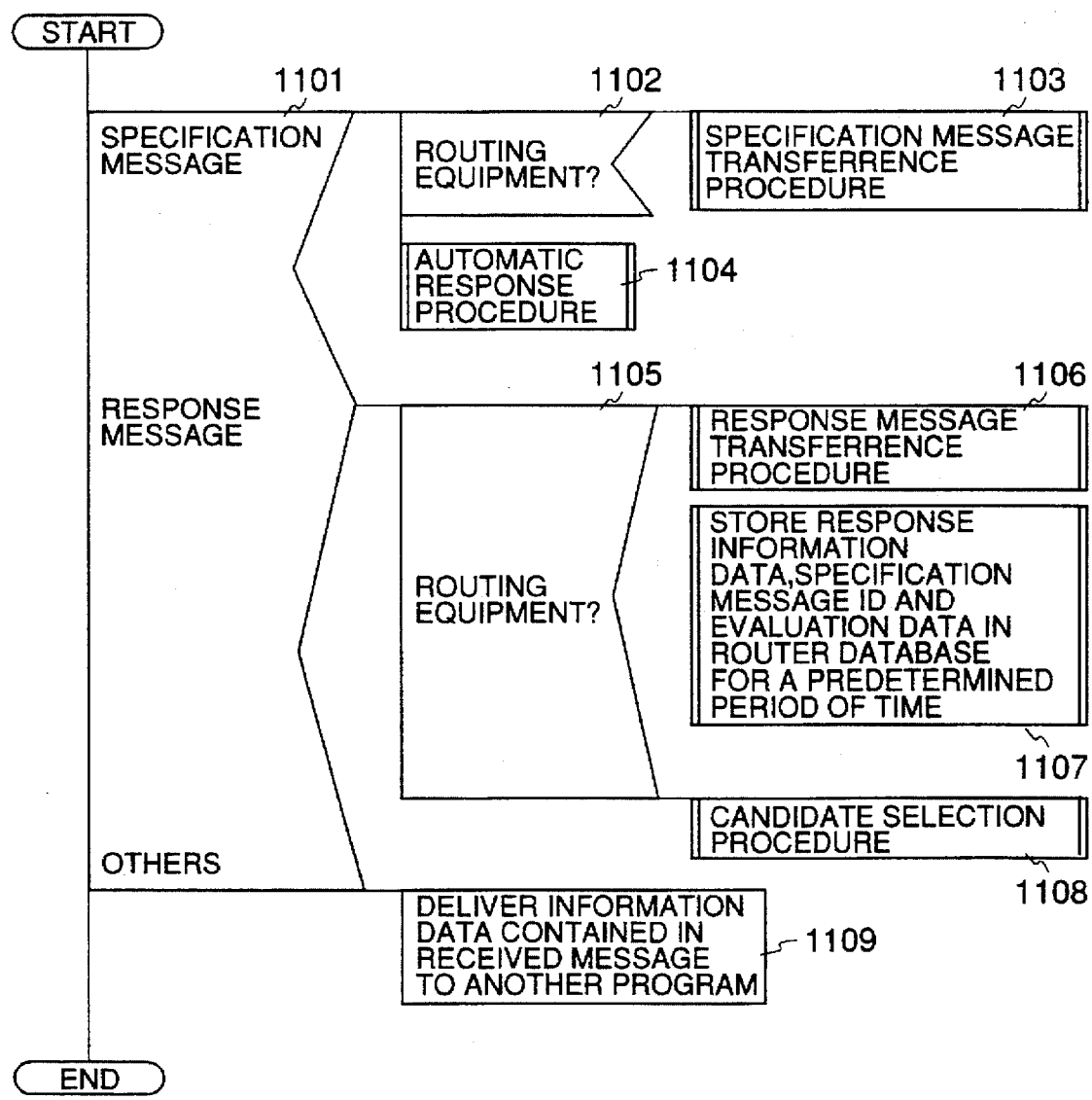
FIG. 11 shows the procedure of reception of a message in one embodiment of the present invention.

The computer operating under the OS of FIG. 5 connected with the local area network processes a message which has arrived at that computer according to the procedure of reception of FIG. 11. First, it is determined whether the received message code is a requested specification message or a response message (step 1101). When the received message is the requested specification message, it is determined whether the equipment (hereinafter referred to solely as a computer) which has received the message is in operation as a routing equipment (hereinafter referred to as a routing computer) (step 1102). If it is a routing computer, the functional block (transfer block) 513 of FIG. 5 processes the received message according to a procedure for transfer of the requested specification message of FIG. 15 (step 1103). Then, the functional block (automatic response function) 512 of FIG. 5 processes the received data according to an automatic response procedure of FIG. FIG. 12 (step 1104). If the received message is a response message to be described later, it is determined whether the computer which has received the message is operating as a routing computer (step 1105). If it is a routing computer, the procedure of transfer of response information data is executed which has the function of suppressing duplicate response of FIG. 16 and which makes use of a router database provided in the routing computer, in order to avoid transmission of response messages having the same response information data on the network in a duplicate manner (step 1106). The router database may include specification message identifiers, evaluation data and response information data contained in specification messages and/or response messages that have passed through the routing computer for repetition of the messages. Subsequently, the response information data, specification message identifiers and evaluation data are stored for a predetermined period of time, for example one week, in a response database (hereinafter referred to as a router database) provided in the routing computer (step 1107). If the computer which has received the response message is not a routing computer, the computer executes a candidate selection procedure of FIG. 17 as a user process for the requester because the computer is the sender of a requested specification message which is the cause of origination of the response message (step 1108).

Figure 12:
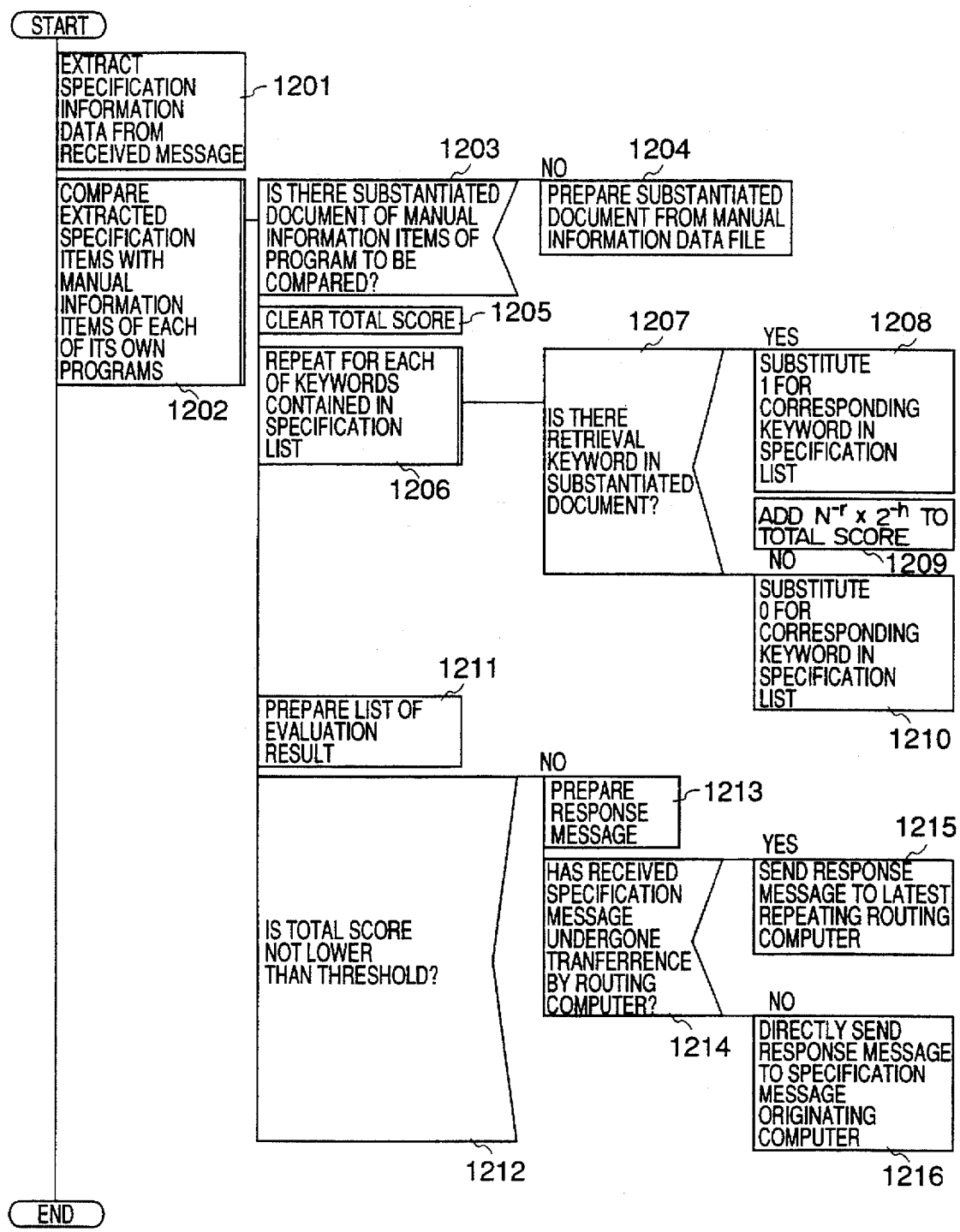
FIG. 12 shows the details of the procedure of automatic response shown in FIG. 11.

The procedure of step 1104 of FIG. 11 will be described below with respect to FIG. 12. Requested specification information data (specification items) are extracted from the received requested specification message having a structure of FIG. 10 (step 1201). The following processing is repeated on the extracted requested specification items or key words with respect to manual information items of all the programs (essential descriptive items contained in manuals describing the programs) stored in the external storage device 111 of FIG. 1 provided for the computer (step 1202). Each of the item lists 820 in the specification list shown in FIG. 8 may correspond to one of the specification items, for example. It is determined whether a file (referred to as a substantiated document) with a hash table excluding duplicated words has been prepared from a manual information data file (a manual document, installation describing document, and document containing upgrade version data) related to a program to be compared (step 1203). If not, a substantiated document is prepared (step 1204). The total score is cleared (step 1205). The following processing is repeated on each of all the keywords contained in the requested specification list (step 1206). It is then determined whether a keyword to be retrieved is in the substantiated document (step 1207). If so, 1 is substituted for the corresponding keyword in the requested specification list (step 1208). $N^{-r} \times 2^{-h}$ is added to the total score where N represents the number of item lists 820 of the requested specification list of FIG. 8, r represents the rank value 810 of the corresponding item list (for example, the value obtained when A, B, Z are 1, 2, 26, respectively) (step 1209). Assume that the keyword is the h-th element in one of a plurality of item lists 820. If there is no corresponding keyword, 0 is substituted for the corresponding keyword of the requested specification list (step 1210). FIG. 13 shows an illustrative result of evaluation corresponding to the requested specification list of FIG. 8. In FIG. 13, the first element represents the total score and the second element is 0 or 1 which has replaced a keyword in the item list of the requested specification list. After a step 1206 is executed, a list of evaluation results of FIG. 13 is prepared (step 1211). The total score is compared with a threshold value, for example, of 0.25 (step 1212). A program having a score exceeding one threshold value is incorporated into a communication data structure of a response message of FIG. 14 (step 1213). It is then determined whether the requested specification message has undergone transfer by a routing computer (step 1214). If so, a response message is sent to the last repeating routing computer (step 1215). If not, the response message is directly sent to the requested specification message originating computer or sender (step 1216).

Figure 14:
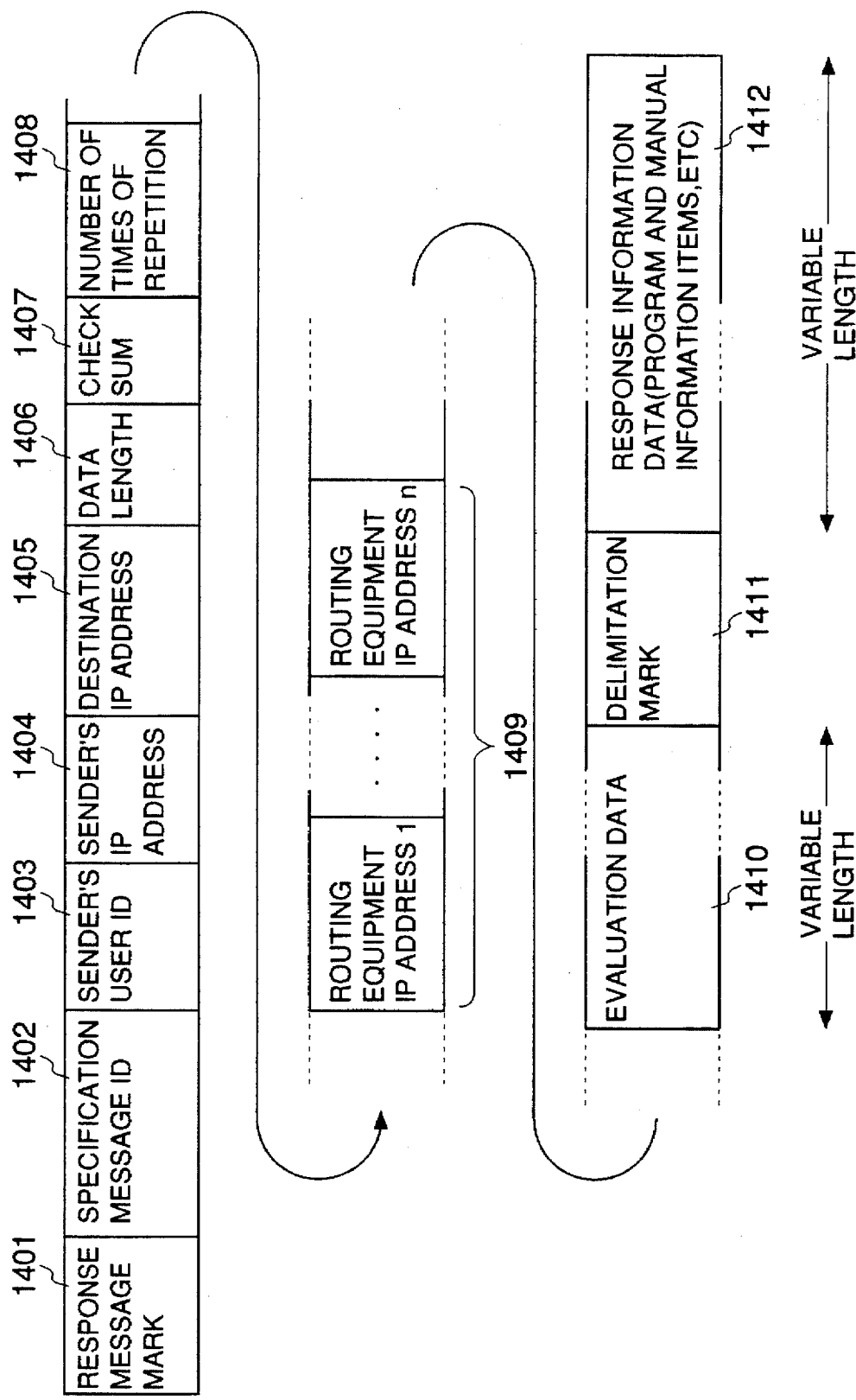
FIG. 14 shows the structure of a response message in one embodiment of the present invention.

FIG. 14 shows the communication data structure of a response message. A response message mark 1401 is followed by a requested specification message ID (identifier) 1402, a sender's user ID 1403, a sender IP address 1404, the number of times of repetition 1408, and a routing equipment IP address 1409, which copy the respective values of the corresponding portions of the communication data structure of the received requested specification message of FIG. 10. A destination ID address 1405 stores a destination IP address determined at step 1215 or 1216 of FIG. 12. A data length 1406 and a check sum 1407 store values calculated for the overall response message. An evaluation data section 1410 stores an evaluation result list of FIG. 13. A delimitation mark 1411 indicative of the end of the evaluation data section is followed by last response information data 1412 which may include, for example, data on locations where the programs are stored, a manual document containing manual information items, an execution module of the program proper and a source code. Response information data 1412 may further include a contract document for program use added thereto, or may only include a manual document or may only include test program (a version in which some functions of the program are eliminated) in accordance with a right granted on the side of the computer which returns the response information data.

Figure 15:
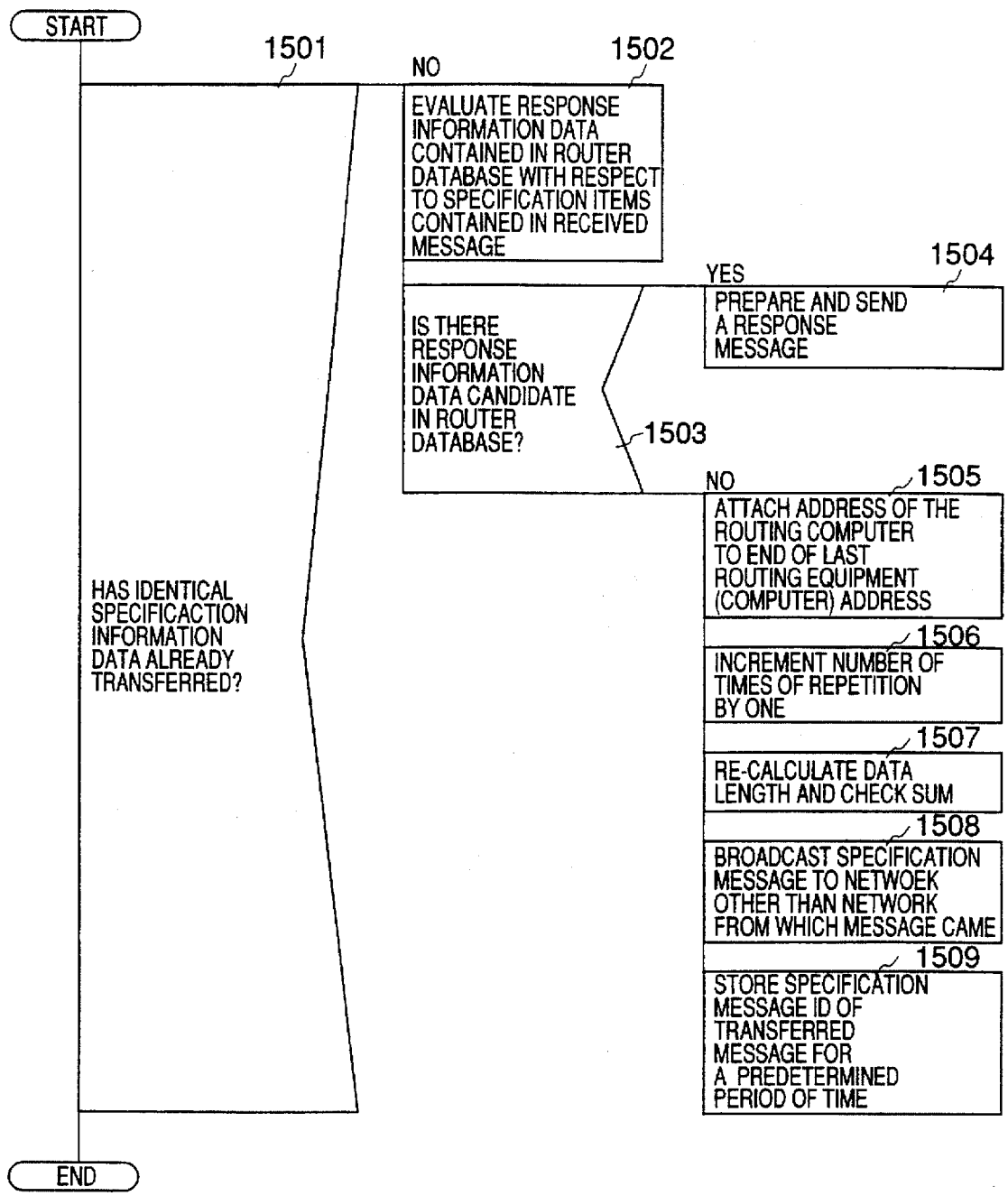
FIG. 15 shows the details of the procedure of transfer of a requested specification message by a routing computer shown in FIG. 11.

FIG. 15 shows the procedure of transfer of the requested specification message referred to in FIG. 11 (step 1103). First, comparison is made between the value of the requested specification message ID 1002 of the received requested specification message having the data communication structure of FIG. 10 and the records of the requested specification message ID having been transferred within a given time, 5 minutes for example, and stored in the router database (step 1501). If there is no identical requested specification message ID and when the response message has passed through the routing computer, requested specification items of the response information data stored in the router database for a predetermined period of time (for example, one week) at step 1107 of FIG. 11 are evaluated as in the steps 1203–1210 of the automatic response procedure of FIG. 12 (step 1502). It is then determined whether the score is equal to, or larger than, that of the stored response information data (step 1503). If so, the response information data (for example, the program or information on the place where the program is located) is handed as a response satisfying the requested specification, and a response message is prepared and sent according to a procedure similar to that including the steps 1213–1215 of FIG. 12 (step 1504). If there is no response data the score of which is larger than the evaluated score of the response information data, the IP address of the computer is attached to the end of the last routing computer IP address (the last routing equipment IP address) of the requested specification message (step 1505). The value of the number of times of repetition 1008 of the requested specification message is incremented by one (step 1506). The data length and check sum are re-calculated (step 1507). A specification message in which the re-calculation is reflected is broadcast toward all the computers connected directly to all the local area networks (communication lines) with which the routing computer is directly connected except for the network from which the requested specification message has been received (step 1508). The requested specification message ID of the transferred requested specification message is stored for a predetermined period of time, for 5 minutes (step 1509), so as to be used when possible duplicate transfer of a message containing the same requested specification data received in a predetermined period of time from this time on is checked at step 1501.

The duplicate transfer suppressing function at step 1501 suppresses unnecessary duplicate transmission of the same requested specification information data occurring depending on the form of loop-like connection of the local area networks (the form of connection of areas 334, 324, 323, 321, 332) in the wide area network shown in FIG. 3 to thereby prevent an unnecessary increase in the network traffic. The vicarious response of the routing computer on the basis of the vicarious response function at step 1504 prevents the requested specification message from being sent at all times to the overall wide area network of FIG. 3 to minimize an increase in the network traffic.

Figure 16:
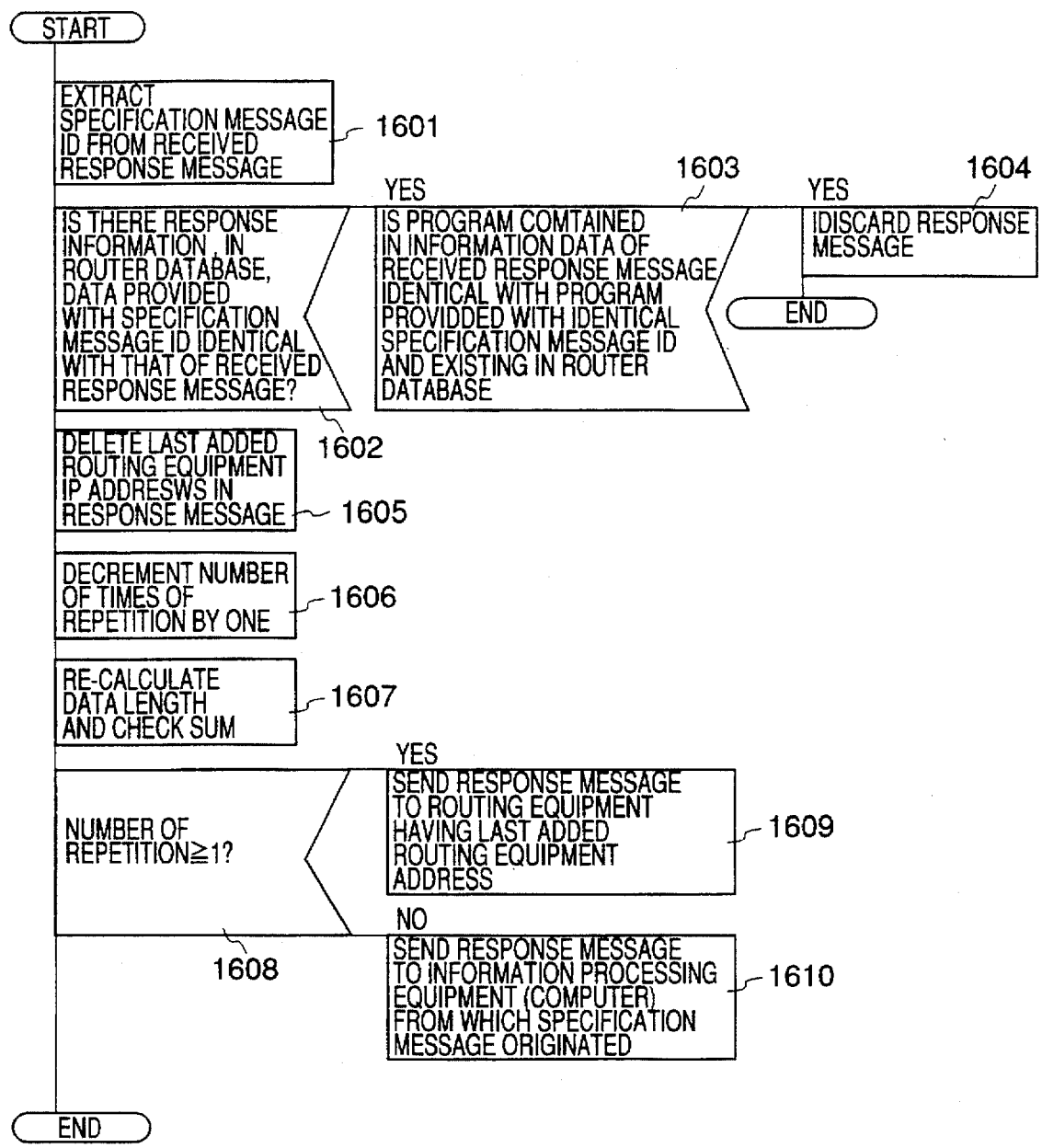
FIG. 16 shows the procedure of transfer of a response message by the routing computer shown in FIG. 11.

FIG. 16 shows the details of the procedure of transfer 1106 of the response message. A requested specification message ID is extracted from the communication data structure of the response message of FIG. 14 (step 1601). It is then checked whether response information data having a requested specification message ID identical with the requested specification message ID extracted at step 1601 exists in the response information data (stored for a predetermined period of time) in the router database at step 1107 of the receiving procedure of FIG. 11 (step 1602). If a response information data having the identical requested specification message ID is found, it is checked whether the program in the response information data of the received response message is identical with the program in the found response information data (step 1603). If so, the received response message is discarded (step 1604). When there is no duplicate response, the last routing equipment IP addresses 408 of the response message is deleted (step 1605), the number of times of repetition is decremented by one (step 1606), and a response message is prepared where the check sum and data length are re-calculated (step 1607). It is then determined whether the number of times of repetition of the reprepared response message is equal to, or larger than, 1 (step 1608). If so, a response message is sent to a routing computer having the last routing equipment IP address (step 1609). When the number of times of repetition of the re-prepared response message is 0, the response message is sent to the information processing computer from which the requested message originated (step 1610).

The duplicate response suppressing procedure of steps 1601–1604 prevents a response message which uses the same program as a response from reaching the computer of the requested specification message sender and also prevents an unnecessary response message from passing through the wide area network to suppress an increase in the communication traffic.

Figure 17:
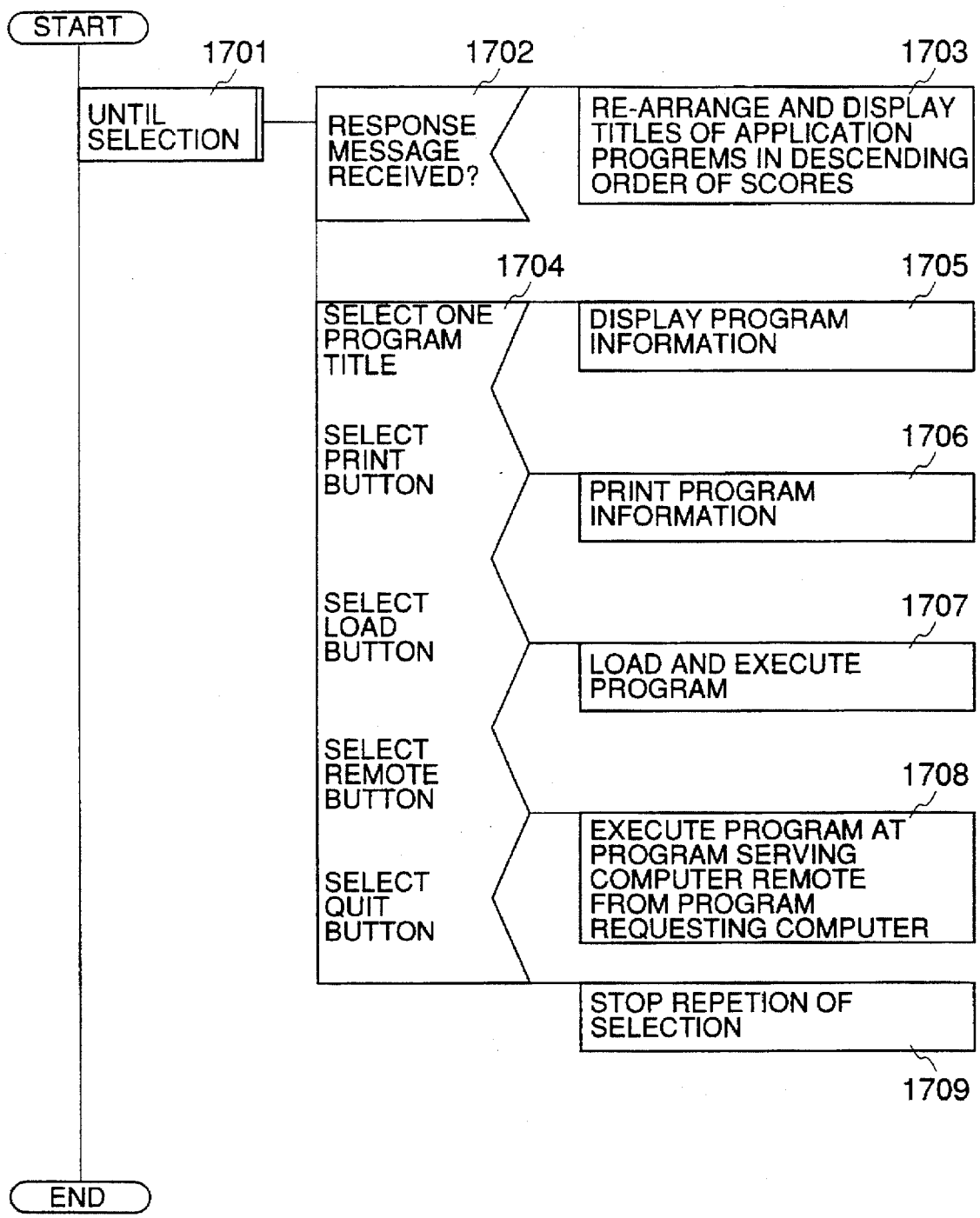
FIG. 17 shows the procedure of selection of a candidate program by a requested specification message sending computer shown in FIG. 11.
Figure 18:
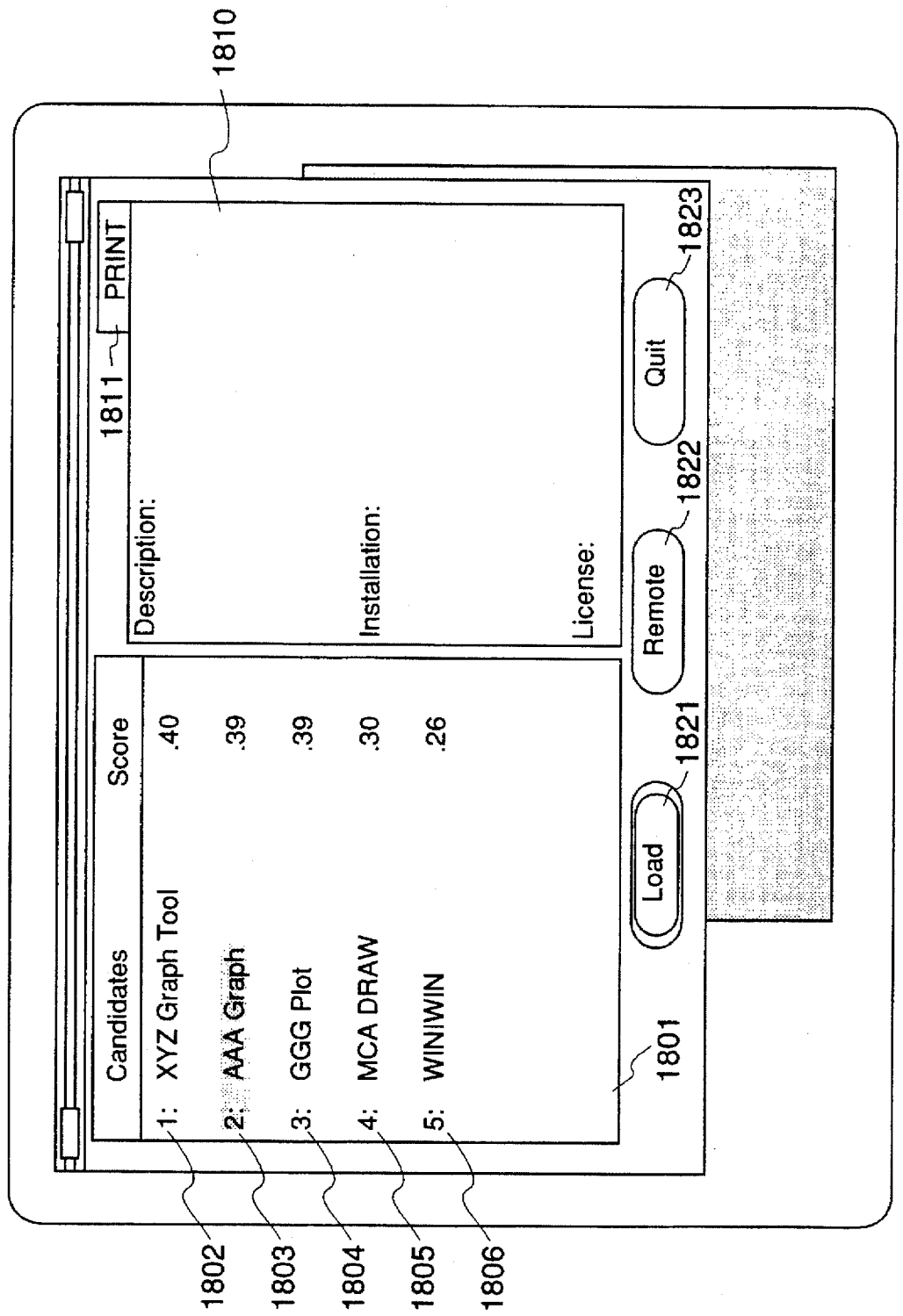
FIG. 18 shows an illustrative picture of a selected candidate program.

The procedure of selection of a candidate program executed by the computer of the sender of the requested specification message which has received a response message containing the response information data will be described with respect to a PAD of FIG. 17 and an illustrative picture of FIG. 18.

The following steps will be iterated until the selection ends (step 1701). First, it is checked whether a new response message has been received (step 1702). If so, the score of the evaluation data of the received response message is compared with those received before the reception of that message and the titles and scores of the programs stored as the information data of the response messages are re-arranged and displayed in descending order in the candidate selection area 1801 of an illustrated candidate selection picture of FIG. 18 (step 1703). It is then determined what is indicated by a pointing device on the picture of FIG. 18 (step 1704). When any one of the programs 1802–1806 displayed in the candidate display area 1801 is selected, the detailed specification of the selected program is displayed on the detailed information display area 1810 (step 1705). When the Print button 1811 is selected, detailed information on a program inclusive of information which cannot be displayed on the display area 1810 is printed out (step 1706). When the Load button 1821 is selected, an executed program is selected from the response information data and loaded and executed (step 1707). When the Load button 1822 is selected, a target program is executed by the program serving computer remote from the program requesting computer so that only the input/output data for the program being executed by the remote computer is processed by the I/O server 520 of the OS functional block of FIG. 5 of the program requesting computer (step 1708). This function allows program resources of many computers having different architectures connected with the wide area network to be easily used as long as only the compatibility of the I/O server 520 os ensured. When the Quit button 1823 is selected, repetition of step 1701 is stopped (step 1709).

In the embodiment described above, program information needed by the user of the computer which satisfies a requested specification for the program can be searched without assistance from another from among the programs held or stored in all the computers connected with a plurality of communication lines (network) with which the computer used by the user is connected to thereby allow all the resources which the computers connected with the communication lines (network) have to be used effectively.

In communication with many computers through the network, passage of messages containing equal information data through a routing equipment in a predetermined period of time is detected and repetition of a message which has arrived later at the routing equipment is prevented to eliminate the propagation of unnecessary communication information in the network to thereby minimize a communication load on the wide area network.

I claim:

1. An information processing equipment, comprising:
   an interface to connect said information processing equipment to a communication line;
   a storage which stores programs and manual information items for each of said programs; and
   processing means having functions of preparing a message and sending said message via said interface to said communication line, receiving a message via said interface from said communication line, discriminating whether a message received from said communication line via said interface by said information processing equipment is a specification message containing specification items of data processing expected to be performed, evaluating each of said programs stored in said storage by comparing said specification items contained in the received message with said manual information items stored in said storage to provide a score for each of said programs based on the comparison and selecting, as information data of a message to be sent, one of said programs having a score greater than a threshold value.

2. An information processing equipment, comprising:
   an interface to connect said information processing equipment to a plurality of communication lines;

a storage for storing a received message via one of said communication lines;

a router database; and processing means having functions of discriminating whether the received message from said communication line via said interface is one of a specification message containing specification items of data processing expected to be performed and a response to the specification message containing specification items of data processing expected to be performed, storing, if the received message is the response to the specification message containing specification items of data processing expected to be performed, data corresponding to the specification message included in the response in said router database, evaluating each of said data stored in said router database by comparing the specification items contained in the received specification message to said data stored in said router database, sending the received specification message to a plurality of said communication lines except the communication line which received the specification message, if the evaluation indicates that none of said data stored in said router database corresponds to the specification items contained in the received specification message and sending one of said data stored in said router database to a sender of the received specification message, if the evaluation indicates that said data stored in said router database corresponds to the specification items contained in the received specification message.

3. An information processing equipment according to claim 2, wherein said processing means further has a function of changing one of said stored data to a sender of the received specification message according to the authority of the sender, if the result of the evaluation shows that the stored data corresponds to the specification items and sending the changed data.

* * * * *